United States Patent [19]

Hildebrand

[11] 4,180,329

[45] Dec. 25, 1979

[54] SINGLE BLADE PROXIMITY PROBE

[75] Inventor: James R. Hildebrand, Palm Beach Gardens, Fla.

[73] Assignee: The United States of America as represented by the Secretary of the Air Force, Washington, D.C.

[21] Appl. No.: 889,795

[22] Filed: Mar. 23, 1978

[51] Int. Cl.² ............................................. G01B 11/14
[52] U.S. Cl. .................................. 356/375; 250/224; 356/23; 415/118
[58] Field of Search ............... 356/372, 373, 375, 426, 356/23; 73/655; 415/118; 250/224, 561; 358/106–108

[56] References Cited

U.S. PATENT DOCUMENTS

| 3,327,584 | 6/1967 | Kissinger | 356/375 |
| 3,599,002 | 8/1971 | Beutelspacher et al. | 356/23 X |
| 3,856,410 | 12/1974 | Swift et al. | 356/398 |
| 3,908,444 | 9/1975 | Peter | 73/71.3 |
| 3,917,432 | 11/1975 | Feuerstein et al. | 415/118 |

FOREIGN PATENT DOCUMENTS

| 783524 | 9/1957 | United Kingdom | 356/375 |
| 1080726 | 8/1967 | United Kingdom | 356/375 |

OTHER PUBLICATIONS

Drinkuth et al., "Laser Proximity Probes for Measurement of Running Turbine Tip Clearance," ISA Paper, 20th Annual Aerospace Instrument Symposium, May 21-23, 1974.

Primary Examiner—F. L. Evans
Attorney, Agent, or Firm—Joseph E. Rusz; Willard R. Matthews, Jr.

[57] ABSTRACT

A single blade proximity probe uses fiber optics to direct a laser output at turbine engine blades and to return the reflected light to an image intensifier probe which provides an output indicative of blade clearance. To enable the system to measure the clearance of a single blade tip on an operating turbine, a second light beam having a different wavelength from the laser output is directed over the laser light path to count the blades and to strobe the laser on the desired blade.

2 Claims, 1 Drawing Figure

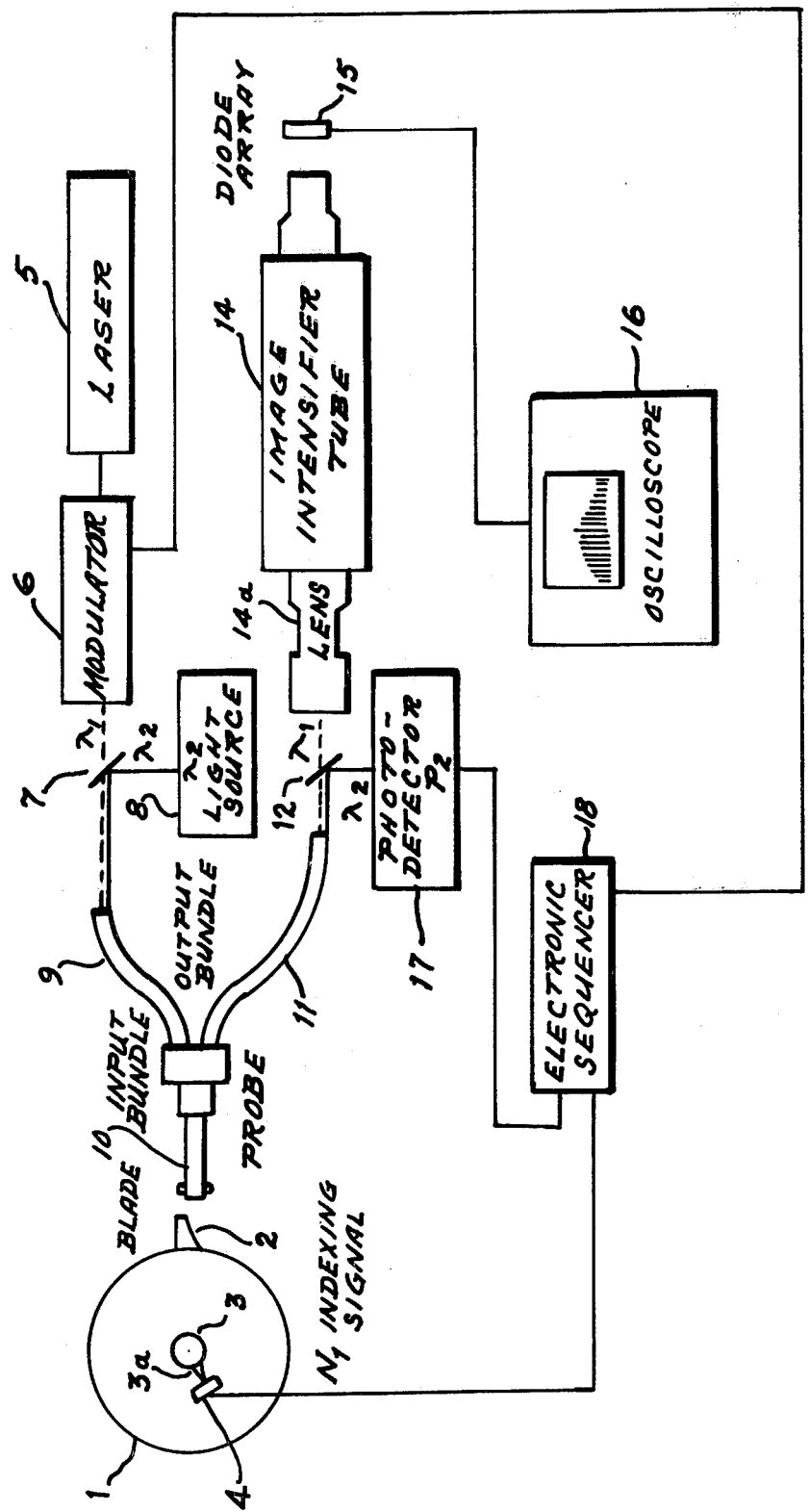

4,180,329

SINGLE BLADE PROXIMITY PROBE

STATEMENT OF GOVERNMENT INTEREST

The invention described herein may be manufactured and used by or for the Government for governmental purposes without the payment of any royalty thereon.

BACKGROUND OF THE INVENTION

In the prior art, lasers have been used to measure average blade tip clearances. However, the measurement of single blade clearances on rotating hardware has not been measured in as precise a fashion as in the present invention. There is provided one improved method and apparatus for measuring a single blade clearance while there is rotation taking place.

SUMMARY OF THE INVENTION

A single blade proximity probe is provided. Laser light of frequency $\lambda_1$ is passed through a laser modulator. A light of frequency $\lambda_2$ is mixed with the modulated laser light. The mixed signal is passed through a probe which then directs the mixed light signals toward the rotating blade of one engine for reflection back to the probe. Before detection of the reflected signals, the signal of frequency $\lambda_2$ is subtracted from the signal of frequency $\lambda_1$. The signal $\lambda_1$ enters the detector system and the signal of $\lambda_2$ is monitored by a photo detector. The output of the photo detector is fed into an electronic sequencer. An indexing signal from the engine triggers the sequencer. The $\lambda_2$ signal is reflected from the blade tip, goes into the photo detector and enables counting the number of blades passing the probe. The sequencer triggers the modulator to allow passage of the $\lambda_1$ signal through the modulator while the subject blade tip is in view of the measuring probe. The indexed signal passes through the system and monitors the blade tip clearance of the subject blade. The modulator is shut off immediately after blade passage.

DESCRIPTION OF THE DRAWING

In the single FIGURE, there is shown a block diagram of the preferred embodiment of the single blade proximity probe.

DETAILED DESCRIPTION OF THE PREFERRED EMBODIMENT

Now referring in detail to the single FIGURE, there is shown rotor 1 having blade 2. Rotor 1 is part of an associated engine. Rotor 1 also includes member 3 with extrusion 3a as a part thereof. There is positioned an electrical proximity probe 4 such as an eddy current, magnetic flux, or electrical closure probe such that at every single rotation of rotor 1 extension 3a will activate proximity probe 4 resulting in a momentary $N_1$ indexing signal. It is noted that additional blades may be attached to rotor 1 in the same manner as blade 2.

In operation of the system of the single FIGURE, laser 5 provides a light of frequency $\lambda_1$ which is passed through laser modulator 6. Light source 8 provides a light of frequency $\lambda_2$. Beam splitter 7 is used to mix the modulated signal (light) of frequency $\lambda_1$ with the signal (light) of frequency $\lambda_2$. The beam splitter may be coated to enhance reflection of signal $\lambda_2$ and transmission of $\lambda_1$ to reduce signal losses in the system. The mixed signals enter input bundle 9 and then probe 10 which directs the mixed signals toward rotating blade 2 or toward a multiplicity of rotating blades. The mixed signals are reflected back to probe 10 and are directed to output coherent bundle 11. Input bundle 9, probe 10 and output bundle 11 may be made of optical fiber or a combination of optical fiber and lenses.

The mixed returned signal of frequency $\lambda_2$ is subtracted from the mixed signal of frequency $\lambda_1$ by the use of selector beam splitter 12 that transmits the signal of frequency $\lambda_1$ but reflects the signal of frequency $\lambda_2$. The beam splitter may be coated to enhance transmission of signal $\lambda_1$ and reflection of signal $\lambda_2$. The signal of frequency $\lambda_1$ enters image intensifier tube 14 by way of lens 14a and is then directed into diode array 15 for transfer for display purposes on the face of oscilloscope 16. It should be noted that the electrical signal displayed on the oscilloscope may be recorded on magnetic tape by use of a tape deck. The signal of frequency $\lambda_2$ from beam splitter 12 is passed through photo detector 17 for monitoring.

The output from photo detector 17 is fed into electronic sequencer 18. The aforementioned $N_1$ indexing signal from the engine triggers the sequencer. The signal of frequency $\lambda_2$ reflected from the blade tip and passing through photo detector 17 enables counting the number of blades passing the probe. The sequencer triggers the modulator to allow passage of the signal of frequency $\lambda_1$ through the modulator during the time in which the subject blade is in view of the probe. The $\lambda_1$ index signal passes through the system and monitors the blade tip clearance. The modulator is shut off immediately after blade passage again determined by the photo detector output. The procedure is repeated for each engine revolution.

I claim:

1. A single blade proximity system comprised of an operative engine rotor having an outer rim, a blade attached to said outer rim, said blade having a tip, an extending member attached to said rotor and rotating therewith to provide a voltage therefrom, an electrical proximity probe positioned to be activated by said rotating extension at each rotation to provide an indexing signal therefrom, a laser providing an output light of frequency $\lambda_1$, a modulator passing the output light of frequency $\lambda_1$, said modulator also receiving an input signal for the control thereof, a source of light of frequency $\lambda_2$, a first beam splitter receiving the modulated light of frequency $\lambda_1$, and said light of frequency $\lambda_2$ for mixing, an optical input bundle receiving the mixed lights of frequencies $\lambda_1$ and $\lambda_2$, an optical probe receiving the mixed lights of frequencies $\lambda_1$ and $\lambda_2$ from said optical input bundle for direction to said blade tip, an output optical bundle receiving reflected mixed lights of frequencies $\lambda_1$ and $\lambda_2$ from said blade tip, a second beam splitter receiving the output from said output optical bundle, said second beam splitter being selective to subtract the reflected mixed light of frequency $\lambda_2$ from $\lambda_1$ an image intensifier tube, a lens operating as an input to said image intensifier tube, the light of frequency $\lambda_1$ from said second beam splitter entering said lens for passage through said image intensifier tube to provide an output therefrom, an oscilloscope having a display face thereupon, a diode array receiving the output from said image intensifier and providing an electrical representative signal for display on the face of said oscilloscope, a photo detector receiving from said second beam splitter a light of frequency $\lambda_2$, and an electronic sequencer receiving two inputs, one of said inputs being said index signal and the second the output from said photo detector, the output of said electronic sequencer serving as said input to said modulator for triggering purposes to allow the output light of frequency $\lambda_1$ from said laser passage through said modulator.

2. A single blade proximity system as described in claim 1 wherein said input optical bundle, said probe and said output optical bundle consist of optical fiber.

* * * * *